United States Patent Office 3,574,514
Patented Apr. 13, 1971

3,574,514
NAPHTHOIC ACID ARYLAMIDE, AMINOBENZENE-AZO-NAPHTHALENE ALKALI METAL SULFITE MODIFIED FORMALDEHYDE AROMATIC HYDROXY COMPOUND AND OMEGA-SULFOMETHYL - HYDROXYNAPHTHALENE-SULFONIC ACID CONDENSATION PRODUCT FOR DYEING CELLULOSE ACETATE AND AROMATIC POLYESTER
Helmut Arm, Langen, Hasso Hertel, Offenbach (Main), and Rudolf Löwenfeld, Buchschlag, Germany, assignors to Farbwerke Hoechst Aktiengesellschaft vormals Meister Lucius & Bruning
No Drawing. Filed May 3, 1968, Ser. No. 726,579
Claims priority, application Germany, May 5, 1967, F 52,330
Int. Cl. D06p 1/02
U.S. Cl. 8—44                                    5 Claims

ABSTRACT OF THE DISCLOSURE

Dyeing preparations for the manufacture of water-insoluble azo dyestuffs on textile material of aromatic polyesters or triacetyl cellulose consisting of (a) an arylamide of 2,3-hydroxynaphthoic acid, (b) a 4-amino-1-benzene-azonaphthalene, (c) a water-soluble condensation product of an aromatic hydroxy compound and an aromatic-ω-methane-sulfonic acid, and (d) water.

The present invention relates to dyeing preparations for the manufacture of water-insoluble azo dyestuffs on textile material made of or containing an aromatic polyester or triacetyl cellulose which comprise (a) an arylamide of 2,3-hydroxynaphthoic acid, (b) a 4-amino-1-benzene-azonaphthalene, (c) a water-soluble condensation product of an aromatic hydroxy compound and an aromatic-ω-methanesulfonic acid, and (d) water.

The dyeing preparations of the present invention are doughs or pastes consisting of about 10 to 30% by weight of an arylamide of 2,3-hydroxynaphthoic acid and about 10 to 30% of 4-amino-1-benzene-azo-naphthalene in about equimolar amounts, as well as of about 6 to 20% by weight of a water-soluble condensation product of an aromatic hydroxy compound and an aromatic-ω-methane-sulfonic acid, and water; they contain the arylamide of 2,3-hydroxynaphthoic acid and the 4-amino-1-benzene-azo-naphthalene in finely dispersed form (particle size: smaller than 0.002 mm.).

In order to avoid freezing at temperatures below 0° C., the dyestuff preparations may furthermore contain a lower aliphatic polyalcohol, for example ethylene glycol or glycerol. To prevent the preparations from becoming moldy, small amounts of a fungicide, for example sodium pentachlorophenolate may be added.

By the addition of water-insoluble phosphoric acid esters, which may be diluted with water-soluble organic solvents, a disturbing foam formation may be prevented during the preparation. Such compounds or mixtures are known from German Pat. No. 724,755. Especially effective for this purpose is a mixture of about 60 parts of triisobutyl phosphate and about 40 parts of isobutyl alcohol.

Such dyeing preparations have very good stability when stored. By simply stirring them into water, which may contain dyeing auxiliaries, dispersions are obtained ready for use which contain the dyestuff components in a very finely dispersed form. These dispersions are very stable so that the dyestuff components may be added to the dyebath in a single portion, even when used at a low ratio of goods-to-liquor, and the feeding which is required when using pulverulent dyeing preparations is not necessary. In consequence of being in the form of a dough or paste, the new dyeing preparations can be handled far better than the known dyeing preparations.

The dyeing preparations of the present invention contain an arylamide of 2,3-hydroxynaphthoic acid which is free from sulfonic acid or carboxylic acid groups and which is used in ice color technique, for example 1-(2',3'-hydroxynaphthoylamino)-2-methylbenzene,
1-(2',3'-hydroxynaphthoylamino)-2-methoxybenzene,
1-(2',3'-hydroxynaphthoylamino)-2,5-dimethoxybenzene,
1-(2',3'-hydroxynaphthoylamino)-2-methyl-4-methoxybenzene,
1-(2',3'-hydroxynaphthoylamino)-2-methoxy-5-chlorobenzene or
1-(2',3'-hydroxynaphthoylamino)-2-methyl-4-chlorobenzene, as well as a 4-amino-1-benzene-azo-naphthalene which is free from sulfonic acid or carboxylic acid groups and which may contain alkyl, alkoxy, nitro, cyano, alkylsulfonyl, arylsulfonyl, acylamino, arylsulfonylamino or alkylsulfonylamino groups, or carboxylic acid amide or sulfonic acid amide groups which amides may be substituted, or halogen atoms.

Moreover, said preparations contain a water-soluble condensation product of an aromatic hydroxy compound and an aromatic ω-methane-sulfonic acid, for example a condensation product of a 4,4'-dihydroxy-diphenylmethane and a 1-ω-sulfomethyl-2-hydroxynaphthalenesulfonic acid, as they are obtainable according to the process of German Pat. No. 426,424, or preferably a condensation product which is obtained by reaction of (1) formaldehyde with (2) a cresol, xylenol or resorcinol-monoalkyl ether or the mixtures thereof and (3) an alkali metal sulfite, and further condensed with (4) a sulfomethyl-hydroxynaphthalene-sulfonic acid, for example according to the process described in Fiat Final Report No. 1,013, as well as water.

The present dyeing preparations are advantageously produced by grinding or kneading the 4-amino-1-benzene-azo-naphthalene and the arylamide of 2,3-hydroxynaphthoic acid with the condensation product of the aromatic hydroxy compound and the aromatic ω-methane-sulfonic-acid in the presence of water.

For use in the dyeing of textile material of aromatic polyesters or triacetyl cellulose, the dyeing preparations are diluted with water and introduced into a dyebath having a temperature of 85–90° C. and containing, if desired, a carrier. Subsequently, the dyeing is carried out in known manner by impregnating at 95–100° C. or under pressure at 110–120° C., diazotizing and after-treating.

The following examples serve to illustrate the invention but they are not intended to limit it thereto. The water-soluble condensation product used in the preparation according to the following examples has been obtained by reaction of 0.7 to 1.3 mols of formaldehyde with 1 mol of the specified aromatic hydroxy compound or mixture thereof and 0.3 to 0.7 mol of sodium sulfite, and further condensed with 0.1 mol of the specified sulfomethyl-hydroxynaphthalene-sulfonic acid or sodium salt thereof, in an analogous manner as described in Fiat Final Report No. 1,013.

EXAMPLE 1

149 g. of 4-amino-1-(4'-benzenesulfonylaminobenzeneazo)-naphthalene (in the form of a moist press cake), 149 g. of 1-(2',3'-hydroxynaphthoylamino)-2-methoxybenzene, 75 g. of the condensation product of formaldehyde, a mixture of equal parts of m- and p-cresol, sodium sulfite and 1-ω-sulfomethyl-2-hydroxynaphthalene-6-sulfonic acid, 1.5 g. of sodium pentachlorophenolate and 476 g. of water are thoroughly mixed and then rolled in a drum mill coated with rubber (content: 2.5 liters) with 1,700 g. of steatite balls (diameter: 18 mm.) for 200 hours on a chair roller. A viscous dispersion is obtained which contains 35% of the dyestuff components and which yields on polyester fibers black dyeings.

EXAMPLE 2

48 g. of 4-amino-1-(4'-methylbenzene-azo)-naphthalene, 40 g. of 2,3-hydroxynaphthoylaminobenzene, 28 g. of the condensation product of formaldehyde, a mixture of m- and p-cresol (ratio 56:44), sodium sulfite and the sodium salt of 2-sulfomethyl-1-hydroxy-naphthalene-5-sulfonic acid, 0.5 g. of sodium pentachlorophenolate, 0.5 g. of a mixture of triisobutyl phosphate and isobutyl alcohol and 183 g. of water are mixed in a high-speed toothed disc device and then finely dispersed by grinding for 60 minutes in a discontinuously agitating ball mill (content of mill pot: 1 liter), which has been fed with 1 kg. of siliquartzite beads having a diameter of 0.5–3 mm. By filtering with suction on a suction filter covered with a wire or textile netting, the dispersion is detached from the beads. The dispersion contains 29.3% of the dyestuff components and yields on polyester fibers black dyeings.

EXAMPLE 3

8.40 kg. of 1-(2',3'-hydroxynaphthoylamino)-2-methoxybenzene, 9.60 kg. of 4-amino-1-(4'-benzenesulfonylaminobenzene-azo)-naphthalene, 6.0 kg. of the condensation product of formaldehyde, a mixture of m- and p-cresol (ratio 1:1) and sodium sulfite and the sodium salt of 1-ω-sulfomethyl-2-hydroxynaphthalene - 6 - sulfonic acid, 0.10 kg. of sodium pentachlorophenolate, 0.10 kg. of a mixture of triisobutyl phosphate and isobutyl alcohol, 12 kg. of ethylene glycol and 23.8 kg. of water are thoroughly mixed. The paste obtained is passed through an agitating ball mill having a content of 5 liters and being fed with siliquartzite beads of a diameter of 0.5–3 mm. The product which had run-off is led back into the mixing vessel. After a grinding for about 50 hours the required fine dispersion is obtained. The viscous dough contains 30% of the dyestuff components.

In an analogous manner dyeing preparations of the following composition may be obtained:

(1) 13.3 parts by weight of 2,3-hydroxynaphthoylaminobenzene, 16.7 parts by weight of 4-amino-1-(2'-methoxy-5'-carbamylbenzene-azo)-naphthalene, 10 parts by weight of the condensation product of formaldehyde, a mixture of m- and p-cresol (ratio 1:1), sodium sulfite and the sodium salt of 1-sulfomethyl-2-hydroxynaphthalene-7-sulfonic acid, 0.2 part by weight of sodium pentachlorophenolate, 0.2 part by weight of a mixture of triisobutyl phosphate and isobutyl alcohol, and 59.6 parts by weight of water.

(2) 14 parts by weight of 1-(2',3'-hydroxynaphthoylamino) - 2 - methoxybenzene, 16 parts by weight of 4-amino-1-(2'-methyl - 5' - dimethylaminosulfonylbenzene-azo)-naphthalene, 10 parts by weight of the condensation product of formaldehyde, a mixture of m- and p-cresol (ratio 1:1), sodium sulfite and the sodium salt of 1-sulfomethyl-2-hydroxynaphthalene-6-sulfonic acid, 0.2 part by weight of sodium pentachlorophenolate, 0.2 part by weight of a mixture of triisobutyl phosphate and isobutyl alcohol, and 59.6 parts by weight of water.

(3) 14 parts by weight of 1-(2',3'-hydroxynaphthoylamino)-4-ethoxybenzene, 16 parts by weight of 4-amino-1-(2'-methoxy - 4' - nitrobenzene-azo)-naphthalene, 11 parts by weight of the condensation product of formaldehyde, a mixture of m- and p-cresol (ratio 40:60), sodium sulfite and the disodium salt of 1-sulfomethyl-2-hydroxynaphthalene-3,6-disulfonic acid, 0.3 part by weight of sodium pentachlorophenolate, 0.2 part by weight of a mixture of triisobutyl phosphate and isobutyl alcohol, and 58.5 parts by weight of water.

(4) 15 parts by weight of 1-(2',3'-hydroxynaphthoylamino)-2-methoxy-5-chlorobenzene, 15 parts by weight of 4 - amino-1-(2'-methyl-5'-chlorobenzene-azo)-naphthalene, 10 parts by weight of the condensation product of formaldehyde, a mixture of m- and p-cresol, sodium sulfite and the sodium salt of 2-sulfomethyl-1-hydroxynaphthalene-8-sulfonic acid, 0.2 part by weight of sodium pentachlorophenolate, and 59.8 parts by weight of water.

(5) 13.3 parts by weight of 1-(2',3'-hydroxynaphthoylamino) - 4 - methylbenzene, 16 parts by weight of 4-amino - 1 - (4'-benzenesulfonylaminobenzene - azo)-naphthalene, 12 parts by weight of the condensation product of formaldehyde, resorcinol-monomethyl ether, sodium sulfite and the sodium salt of 1-sulfomethyl-2-hydroxynaphthalene-6-sulfonic acid, 0.2 part by weight of a mixture of triisobutyl phosphate and isobutyl alcohol, and 58.5 parts by weight of water.

(6) 14 parts by weight of 1-(2',3'-hydroxynaphthoylamino)-2-methoxybenzene, 16 parts by weight of 4-amino - 1 - (4' - benzenesulfonylaminobenzene-azo)-naphthalene, 8 parts by weight of the condensation product of formaldehyde, a mixture of 4-hydroxy-1,2-dimethylbenzene and 5-hydroxy-1,3-dimethylbenzene (ratio 1:1), sodium sulfite and the sodium salt of 1-sulfomethyl-2-hydroxynaphthalene - 6 - sulfonic acid, 0.2 part by weight of sodium pentachlorophenolate, 0.2 part by weight of a mixture of triisobutyl phosphate and isobutyl alcohol and 61.6 parts by weight of water.

(7) 14 parts by weight of 1 - (2',3' - hydroxynaphthoylamino) - 2 - methoxybenzene, 13.3 parts by weight of 4 - amino - 1 - benzene-azo-naphthalene, 10 parts by weight of the condensation product of formaldehyde, a mixture of m- and p-cresol (ratio 1:1), sodium sulfite and the sodium salt of 1-sulfomethyl-2-hydroxynaphthalene - 6 - sulfonic acid, 0.2 part by weight of sodium pentachlorophenolate, 0.2 part by weight of a mixture of triisobutyl phosphate and isobutyl alcohol, 62.3 parts by weight of water.

(8) 15 parts by weight of 1-(2',3' - hydroxynaphthoylamino) - 2 - methyl - 4 - methoxybenzene, 15 parts by weight of 4 - amino - 1 - (4'-benzenesulfonylaminobenzene-azo)-naphthalene, 12 parts by weight of the condensation product of formaldehyde, a mixture of m- and p-cresol (ratio 1:1), sodium sulfite and the sodium salt of 2 - sulfomethyl-1-hydroxynaphthalene-5-sulfonic acid, 0.2 part by weight of sodium pentachlorophenolate, 0.2 part by weight of a mixture of triisobutyl phosphate and isobutyl alcohol, 57.6 parts by weight of water.

We claim:

1. A dyeing preparation for the manufacture of water insoluble dyestuffs on a textile material made of or containing an aromatic polyester or triacetyl cellulose which comprises (a) about 10 to 30 percent by weight of an arylamide of 2,3-hydroxynaphthoic acid which is free from carboxylic acid and sulfonic acid groups, (b) about 10 to 30 percent by weight of a 4-amino-1-benzene-azo-naphthalene, said components (a) and (b) being present in about equimolar proportions, (c) about 6 to 20 percent by weight of a water-soluble condensation product obtained by reacting (1) formaldehyde with (2) cresol, xylenol, resorcinol-monoalkyl ether or mixtures thereof and (3) an alkali metal sulfite, and further condensing with (4) ω-sulfomethyl-hydroxynaphthalene-sulfonic acid or an alkali metal salt thereof, and (d) water in an amount to form, with the other constituents, a dough or a paste.

2. A dyeing preparation as claimed in claim 1, comprising (a) 14.0 percent by weight of 1-(2',3'-hydroxynaphthoylamino) - 2 - methoxybenzene, (b) 16.0 percent by weight of 4 - amino - 1 - (4' - benzenesulfonylaminobenzene-azo)-naphthalene, (c) 10.0 percent by weight of the condensation product obtained by reaction of 0.7 to 1.3 mols of formaldehyde with 1 mol of a mixture (1:1) of m- and p-cresol and 0.3 to 0.7 mol of sodium sulfite, and further condensed with 0.1 mol of the sodium salt of 1-sulfomethyl-2-hydroxynaphthalene-6-sulfonic acid, (d) 39.6 percent by weight of water, and further 0.2 percent by weight of sodium pentachlorophenolate, 0.2 percent by weight of a mixture (60:40) of triisobutyl phosphate and isobutyl alcohol and 20.0 percent by weight of ethylene glycol.

3. A dyeing preparation as claimed in claim 1, comprising (a) 13.3 percent by weight of 1-(2',3'-hydroxynaphthoylamino) - 4 - methylbenzene, (b) 16 percent by weight of 4 - amino - 1 - (4' - benzenesulfonylaminobenzene-azo)-naphthalene, (c) 12.0 percent by weight of the condensation product obtained by reaction of 0.7 to 1.3 mols of formaldehyde with 1 mol of resorcinol-monomethyl ether and 0.3 to 0.7 mol of sodium sulfite, and further condensed with 0.1 mol of the sodium salt of 1 - sulfomethyl - 2 - hydroxynaphthalene - 6-sulfonic acid, (d) 58.5 percent by weight of water, and further 0.2 percent by weight of a mixture (60:40) of triisobutyl phosphate and isobutyl alcohol.

4. A dyeing preparation as claimed in claim 1, comprising (a) 14.0 percent by weight of 1-(2',3'-hydroxynaphthoylamino) - 2 - methoxybenzene, (b) 16.0 percent by weight of 4-amino-1-(4'-benzenesulfonylaminobenzene-azo)-naphthalene, (c) 8.0 percent by weight of the condensation product obtained by reaction of 0.7 to 1.3 mols of formaldehyde with 1 mol of a mixture (1:1) of 4 - hydroxy - 1,2 - dimethylbenzene and 5-hydroxy-1,3-dimethylbenzene and 0.3 to 0.7 mol of sodium sulfite, and further condensed with 0.1 mol of the sodium salt of 1-sulfomethyl - 2 - hydroxynaphthalene-6-sulfonic acid, (d) 61.6 percent of water, and further 0.2 percent by weight of sodium pentachlorophenolate and 0.2 percent by weight of a mixture (60:40) of triisobutyl phosphate and isobutyl alcohol.

5. A dyeing preparation as claimed in claim 1, comprising (a) 15.0 percent by weight of 1-(2',3'-hydroxynaphthoylamino) - 2 - methyl - 4 - methoxybenzene, (b) 15.0 percent by weight of 4 - amino-1-(4'-benzenesulfonylaminobenzene-azo)-naphthalene, (c) 12.0 percent by weight of the condensation product obtained by reaction of 0.7 to 1.3 mols of formaldehyde with 1 mol of a mixture (1:1) of m- and p-cresol and 0.3 to 0.7 mol of sodium sulfite, and further condensed with 0.1 mol of the sodium salt of 2-sulfomethyl-1-hydroxynaphthalene-5-sulfonic acid, (d) 57.6 percent by weight of water, and further 0.2 percent by weight of sodium pentachlorophenolate acid 0.2 percent by weight of a mixture (60:40) of triisobutyl phosphate and isobutyl alcohol.

References Cited
UNITED STATES PATENTS

| | | | |
|---|---|---|---|
| 1,532,427 | 4/1925 | Metzger | 8—171 |
| 1,870,498 | 8/1932 | Ellner | 8—46 |
| 2,999,731 | 9/1961 | Harding | 8—54 |

FOREIGN PATENTS

| | | | |
|---|---|---|---|
| 246,181 | 6/1927 | Great Britain | 8—44 |
| 426,424 | 6/1926 | Germany. | |
| 724,755 | 9/1942 | Germany. | |

OTHER REFERENCES

Chem. of Syn. Dyes, Venkataraman, 1952, pp. 658–663.

DONALD LEVY, Primary Examiner

PATRICIA C. IVES, Assistant Examiner

U.S. Cl. X.R.

8—46, 171